United States Patent Office 2,857,268

Patented Oct. 21, 1958

2,857,268

SUPERCONDUCTING VANADIUM BASE ALLOY

Harold J. Cleary, Boston, Mass., assignor to the United States of America as represented by the United States Atomic Energy Commission No Drawing. Application August 27, 1957
Serial No. 680,606

3 Claims. (Cl. 75—134)

This invention relates to a new superconducting vanadium base alloy and more particularly to a binary vanadium-palladium alloy which is useful as a cryotron in digital computer circuits.

This invention has as an object the discovery of new uses for metallic vanadium to increase the industrial applications thereof. A further object is to develop a vanadium base alloy having pronounced superconductivity at low temperatures. Other objects will appear hereinafter.

These objects are accomplished by the following invention which relates to a new binary vanadium-palladium alloy which contains about 1 atomic percent of palladium. This alloy was prepared by arc-melting the ingredients thereof under an argon atmosphere using a water-cooled copper crucible and a tungsten electrode. Homogeneity was improved by flipping over the buttons and remelting several times. The vanadium metal used in preparing this alloy was in the forms of chips and ingots. Chemical analyses of these chips and ingots showed that the carbon, oxygen, nitrogen, and hydrogen impurities totalled from 0.151% to 0.180%. About one third of these impurities was carbon, one third was oxygen, one third was nitrogen, and only a trace was hydrogen. The palladium used in preparing this alloy was in the form of a sheet having a purity of 99.9%. The alloy which was prepared contained 0.99 atomic percent of palladium. This alloy had a hardness of 48 on the Rockwell A scale. It showed good resistance against attack when exposed to concentrated (12 N) HCl and concentrated (saturated) NaOH at room temperature (19° to 25° C.).

Studies of the electrical properties of this alloy show that it has some unique properties in the superconducting range that make it useful in the cryotron, a new type of electronic amplifier. This V–Pd alloy has a superconductive transition temperature in a convenient region for use as the central wire in a cryotron structure, and it has a high volume resistivity when in the normal state at the temperature of liquid helium and therefore provides circuits of higher operating speed than that of cryotron circuitry which ordinarily uses pure tantalum as the central wire. In making these electrical resistivity studies the experimental work described in the following paragraphs was carried out.

Specimens measuring approximately 0.075 in. x 0.075 in. long were machined from the as-cast buttons. The electrical resistance at room temperature was measured by the conventional technique of placing the sample in series with a standard resistance and measuring the IR drop across each. The resistivity was then calculated from the measured resistance and the physical dimensions of the specimen.

Wires were tested for superconductivity in liquid helium to determine their usefulness as power amplifiers in flip-flop circuits of a digital computer. The operation of the device may be described, briefly, as follows: When a superconductor is placed in a magnetic field, there is a lowering of the critical temperature below which the metal is superconducting. Experimentally, a helix of very fine insulated niobium wire was wrapped around a fine straight vanadium alloy wire; this assembly was placed in liquid helium. The D. C. characteristics of the straight wire were determined by applying a known magnetic field (current through niobium helix) and measuring the lowered temperature at which the straight piece of wire again becomes superconducting. For application as a power amplifier, a pulsating signal is applied to the niobium coil. The straight wire goes in and out of the superconducting region, thereby causing discontinuous variation in the resistance at the same frequency as the input signal. The straight wire is fed by a constant source, and the potential across it is measured. The power gain of this device decreases with increasing frequency of signal input to the niobium coil, and drops to unity or less at sufficiently high frequencies. The upper frequency limit at which power gain drops to unity may be raised by increasing the residual resistance of the wire: (*a*) by using wires of finer diameter, or (*b*) by using wires of higher residual resistivity.

The data obtained in these studies are given in the table below. All the wires tested for superconductivity were found to possess this property. Values for the residual resistivity and the minimum threshold field required to destroy superconductivity are given in the table below. The V–Pd alloy is of great interest because of its relatively high residual resistivity coupled with relatively low value for the threshold field. The residual resistivity of this alloy is roughly 15 times that for pure tantalum, while its magnetic field is only 3 times that of tantalum. Tantalum is the principal competing material. This alloy is therefore very promising in this application.

TABLE

*Electrical resistivity properties*

| Metal | Electrical Resistivity at 30.6° C. (microhm-cm.) | Residual Resistivity at 4.2° K. (microhm-cm.) | Approximate Threshold Magnetic Field at 4.2° K. (Oersted) |
|---|---|---|---|
| Pure Vanadium | 25.2 | 0.2 | 4,000 |
| V+0.99a/O Pd | 25.7 | 7.55 | 197 |
| Pure Tantalum: | | | |
| Vacuum fired | ---------- | 0.56 | 67 |
| Annealed | ---------- | 0.84 | 49.6 |

Resort may be had to such variations and modifications as fall within the spirit of the invention and the scope of the appended claims.

I claim:

1. A new binary vanadium-palladium alloy which contains about 1 atomic percent of palladium.

2. A vanadium base alloy which consists of vanadium and about 1 atomic percent of palladium.

3. A cryotron in a digital computer circuit which comprises a wire made from a V–Pd alloy which contains about 1 atomic percent of Pd.

References Cited in the file of this patent

"Superconductivity of Vanadium," Wexler and Corak, Physical Review, vol. 85, 1952, pages 85–90.

"Electrical, Thermoelectric, Hardness, and Corrosion Properties of Vanadium-Base Alloys," Cleary, U. S. Atomic Energy Commission Report, NMI–1161, Sept. 5, 1956.